June 4, 1940.　　　　L. IVERSEN　　　　2,202,910

TRIMMING MACHINE

Filed June 23, 1938　　　5 Sheets-Sheet 1

INVENTOR
Lorenz Iversen

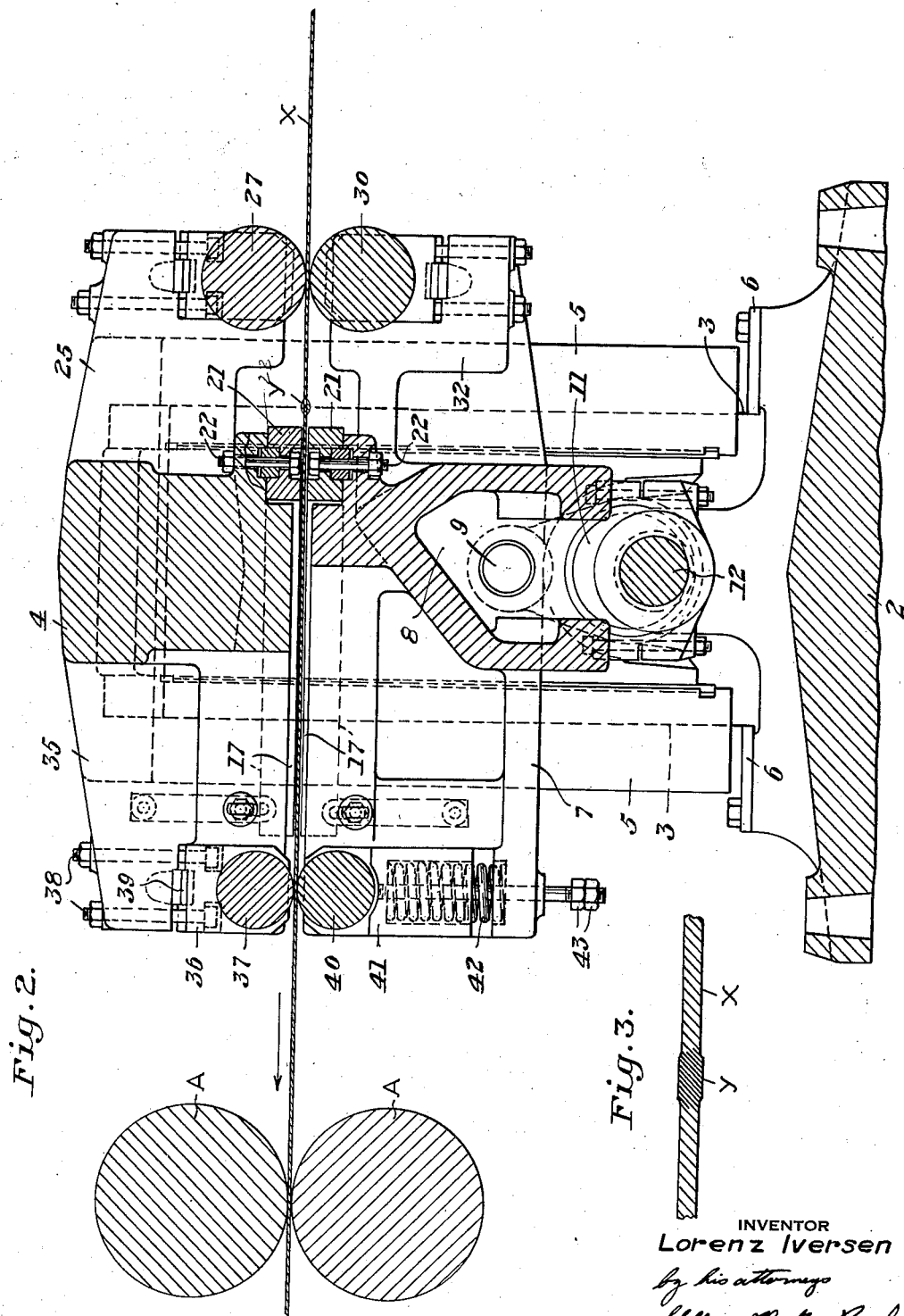

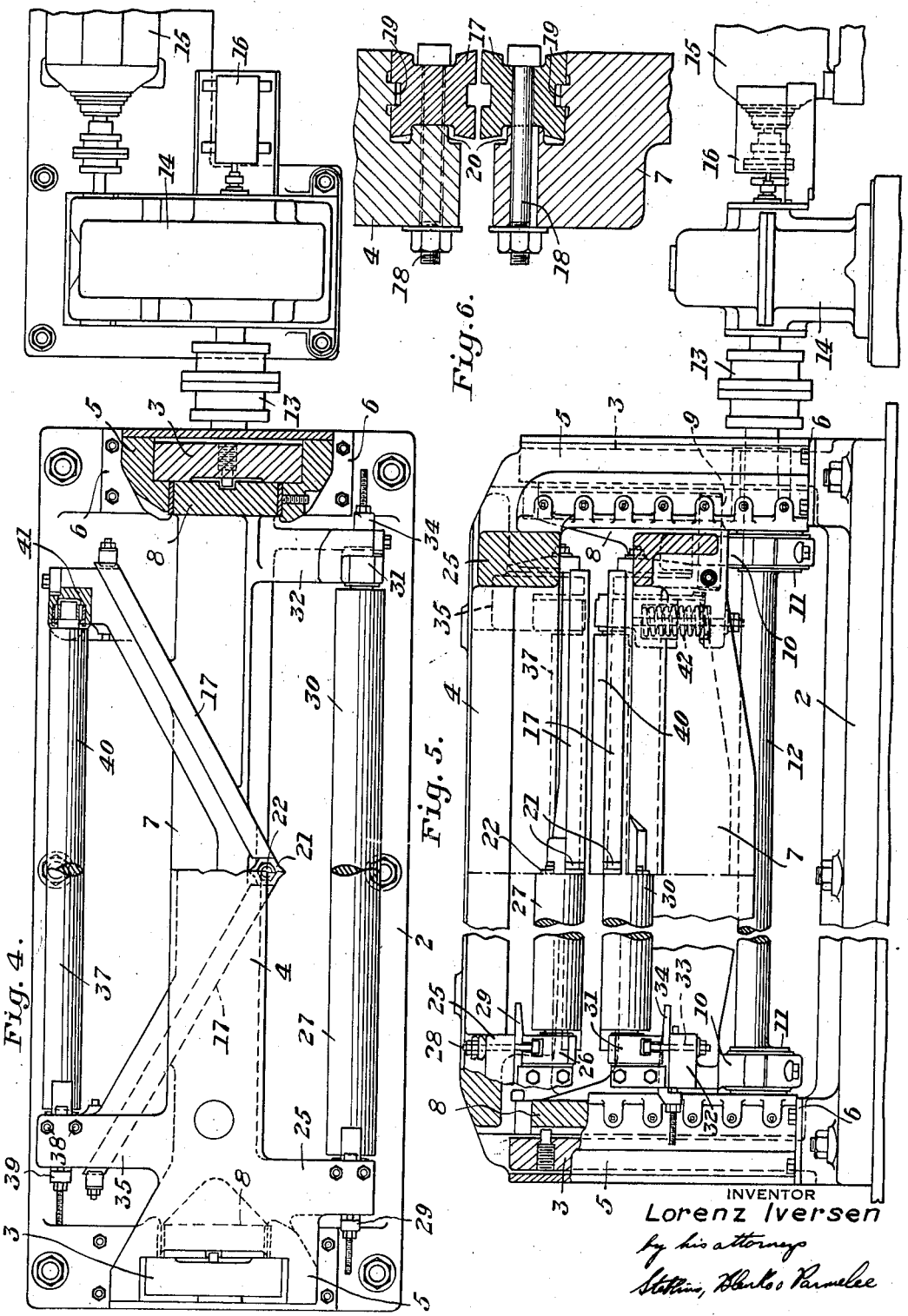

INVENTOR
Lorenz Iversen
by his attorneys

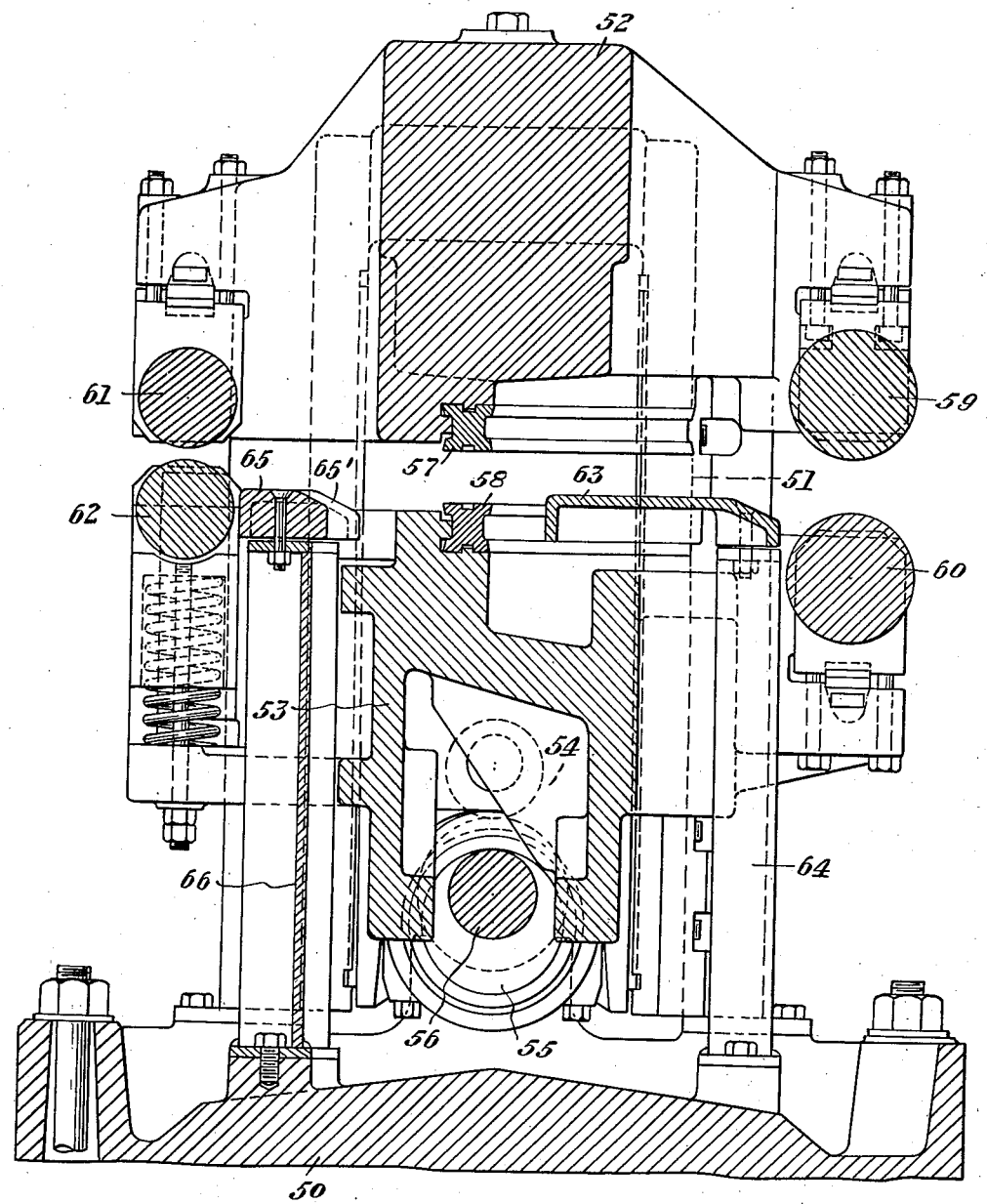

Patented June 4, 1940

2,202,910

UNITED STATES PATENT OFFICE 2,202,910

TRIMMING MACHINE

Lorenz Iversen, Pittsburgh, Pa., assignor to Mesta Machine Company, Pittsburgh, Pa., a corporation of Pennsylvania Application June 23, 1938, Serial No. 215,387

14 Claims. (Cl. 90—24)

This invention relates to trimming machines and is for a machine for removing or reducing protuberances on the surface of sheet metal. It is particularly applicable for trimming away excess metal from the weld where two pieces of strip metal have been welded together in end-to-end relation.

In the art of rolling thin flat strip material it is commonly the practice to weld two or more strips or coils of metal together after they have been formed in the hot mill before subjecting them to the further steps of pickling and cold rolling. The weld is most effectively accomplished by a method of flash welding as disclosed in my copending application Serial No. 215,388 filed June 23, 1938. According to this method, the ends of the strips to be welded are brought into close proximity while an electric current is arced across the gap separating them, heating up the edges of the metal. When the welding temperature has been reached, the two strip ends are forced together resulting in a weld which is thicker than the parent material and which projects from both surfaces of the strip. Before the strip is delivered to a cold rolling mill, the thickness of the weld should be reduced to approximately the thickness of the parent strip.

According to the present invention there is provided a trimming unit especially designed to be incorporated in a line of equipment between the hot mill and the pickling tank through which the strip material may be more or less continuously passed and which can be operated from time to time where a weld is encountered. Ordinarily the flash trimmer is located immediately after the flash welder in the pickling line as disclosed in my application above referred to.

The present invention also provides a trimmer which automatically adjusts itself for use with different thicknesses of strip metal within a given range and which may be adjusted to closely trim the weld without scoring or cutting into the parent strip. Moreover, the invention provides a trimming device for this purpose which is rugged, long lasting, and requires little attention for its operation.

The invention may be readily understood by reference to the accompanying drawings which illustrate certain embodiments of the invention and in which Figure 1 is a longitudinal vertical section through one form of trimmer showing the trimming knives operated the maximum distance;

Figure 2 is a similar view showing the knives in a nearly closed position;

Figure 3 is a detailed view indicating the manner in which the welded joint is trimmed;

Figure 4 is a top plan view of the apparatus shown in Figure 1, one end of the machine being shown partly in section, the view being on a smaller scale than Figure 1;

Figure 5 is a front elevation of the machine shown in Figure 1, certain portions, however, being illustrated in section, this view also being on a smaller scale than Figure 1;

Figure 6 is a detailed view of the knives, the view being a transverse section;

Figure 9 is a transverse vertical section through the machine shown in Figure 7, the view being substantially in the plane of line IX—IX of Figure 7.

Figure 1:
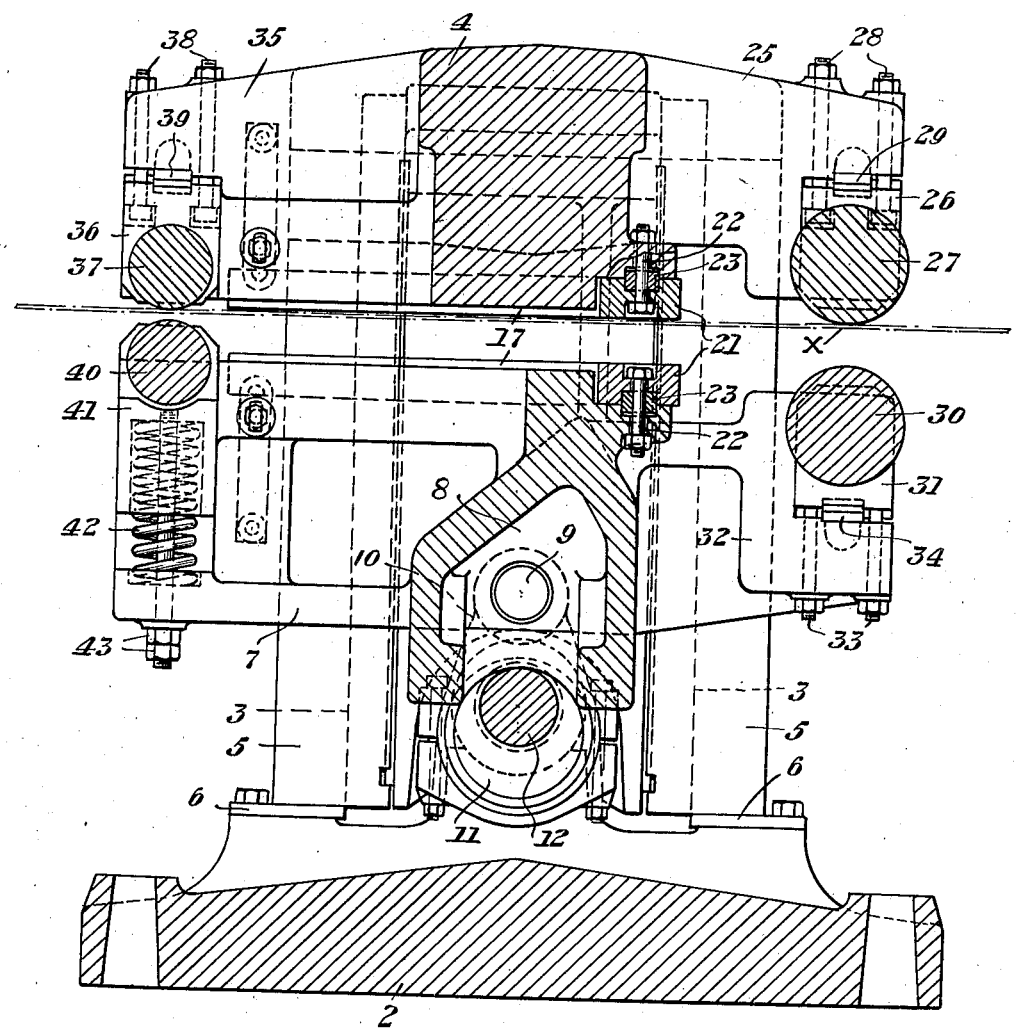

Referring first to Figs. 1 to 6 of the drawings, 2 designates a base member having integral guide posts 3 projecting upwardly therefrom adjacent each end thereof. There is a top or upper knife carrier 4 in the form of a heavy metal casting having depending parallel legs 5 at each end thereof which slidably engage the posts 3 as best shown in Figure 4, the legs normally resting on wear plates 6 bolted to the base member. Positioned under the top knife carrier 4 is a lower or bottom knife carrier 7 comprising a cross member having end portions 8 which abut against the posts 3 and which are slidably guided between the legs 5 of the upper knife carrier as best shown in Fig. 4. Each end portion 8 of the bottom knife carrier is provided with a pin 9. The upper end of an operating link or pitman 10 engages the pin 9. The lower end of this pitman or link fits about an eccentric 11 on a shaft 12. The shaft 12 may be driven through a coupling 13 and reducing gear 14 by a motor 15 as shown in Figs. 4 and 5. Normally the parts are in the position shown in Fig. 2, but upon operation of the motor 15, the shaft 12 is rotated to rotate the eccentrics 11 to transmit a vertical movement through the pitmans 10 to the lower knife carrier. A limit switch 16 may be provided for stopping the shaft 12 with the lower knife carrier either in its lowermost position or in its uppermost position.

The trimming knives in the construction shown in Figs. 1 to 6 are illustrated as being arranged in V form with the two knives forming the legs of the V converging toward the front of the machine. The knives in both the top and the bottom holder are designated 17 and they are shown in detail in Fig. 6. They are preferably so shaped that four cutting edges are provided, anyone of which may be selectively used. They are removably held in place by bolts 18 which pass through them and through suitable projections or abutments on the respective carriers. The trimming knives 17, in addition to being held in place by bolts 18 are kept in position by tongues 19 and 20 formed on the respective carriers and which enter the grooves in the knives as clearly shown in Fig. 6. By reason of this arrangement, the alignment of the knives is maintained irrespective of any dressing of the cutting edges of the knives from time to time.

At the point of convergence of the knives 17 there is a pointed insert or tip 21 held in place by a bolt 22. This point or tip serves to start the trimming cut at or near the center of the strip. A spool 23 engaged in a recess of each of the inserts keeps the inserts accurately positioned. The inserts are reversible and they may also be turned over, to thereby provide four cutting points, anyone of which may be selectively used.

Projecting forwardly from each end of the upper head or carrier member 4 are integral arms 25 on each of which is provided a bearing block 26 and a roller 27 that extends across the front of the top member. The block 26 is adjustable by means of bolts 28 and adjusting wedges 29. Similarly located on the lower knife carrier is a transverse roller 30 carried in bearing blocks 31 on the outer end of forwardly projecting arms 32 extending outwardly from the member 7 at each end thereof. The bearing blocks 31 are adjustable by means of bolts 33 and adjusting wedges 34.

Extending rearwardly from the upper knife carrier 4 at each end thereof is an extension 35 on each of which is carried an adjustable bearing 36. These bearings 36 support the opposite end of a transversely extending roller 37. The bearings 36 are adjustable by means of bolts 38 and adjusting wedges 39.

Under the roller 37 is another transverse roller 40 which is on the lower knife carrier in bearing blocks 41, the bearing blocks 41 being yieldably supported by compression springs 42, the upward movement of the bearing blocks 41 under the compression of the springs 42 being adjustably limited by bolts 43.

Before operation of the machine, the roller 27 is adjusted downwardly until its periphery is slightly below the bottom edge of the upper knives. The transverse roller 30 is adjusted so that it extends slightly above the upper face of the bottom knives. The rollers 37 and 40 are correspondingly adjusted. The eccentric 11 is arranged so as to impart a vertical stroke to the bottom knife ram in excess of the distance which initially separates the top and bottom knives.

In operation it may be assumed that the parts are in the position shown in Fig. 1 with the lower knife carrying ram in its lowermost position and with the top knife carrier limited from further downward movement by reason of the legs 5 contacting with the wear plates 6 as shown in Fig. 1. The welded strip is designated X in Figs. 1 and 2 and is run between the upper and lower knife carriers. The weld, indicated at Y in Fig. 2 is run past the rollers 27 and 30 after which the strip is stopped. Movement of the strip is effected by the pinch rolls A in Fig. 2. When the strip has been stopped with the weld Y past the rollers 27—30 and with the weld in advance of the knives, the motor 15 is operated to rotate the shaft 12 through 180° of travel. As the shaft 12 rotates through 180° of travel, the lower knife carrier will be moved up toward the strip X. The lower roller 30 will contact the strip and through the strip transmit a limited vertical movement to the upper knife carrier before the lower carrier has reached the uppermost limit of its travel. By thus causing the upper knife carrier to be lifted by the motion of the knife carrier transmitted through the intervening strip material, the machine automatically adjusts itself for operation upon any thickness of strip metal within the range for which the machine is designed to be used. After the lower knife carrier has reached the uppermost limit of its travel, the pinch rolls A are again started to pull the strip through the trimmer. The knives will shear off excess metal in the weld Y, trimming it down to approximately the thickness of the parent strip. This is illustrated in Fig. 3 where the weld Y is shown trimmed off to very nearly the thickness of the strip X. The weld may be trimmed down to the thickness of the parent strip if necessary by adjusting the rollers 27, 37, and 30 with respect to the knives. For example, if the bottoms of the rollers 27 and 37 are flush with the bottom of the upper knife and the top of the roll 30 is flush with the top of the upper knife, the weld will be trimmed off flush with the surface of the strip. In order to avoid the possibility of scoring the strip, however, it is preferable to trim the weld so that it is only slightly thicker than the parent stock.

By reason of the fact that lower roll 40, mounted on the rear of the bottom knife carrier, is resiliently supported on springs, the spacing of the knives is determined by the forward rollers 27 and 30. If the roller 40 were not so supported, extremely accurate adjustment would be required between the front and rear rollers to effect a uniform spacing of the knives. Since the upper knife carrier floats, it is made of massive construction so that its weight is greater than the cutting thrust to prevent separation of the knives during the trimming operation.

After the weld has been trimmed, the shaft 12 is again rotated through an arc of 180° to restore the parts to the position shown in Fig. 1. When the machine has been thus opened, the strip material can be pulled through it by the pinch rolls without danger of the strip being damaged.

Figure 8:
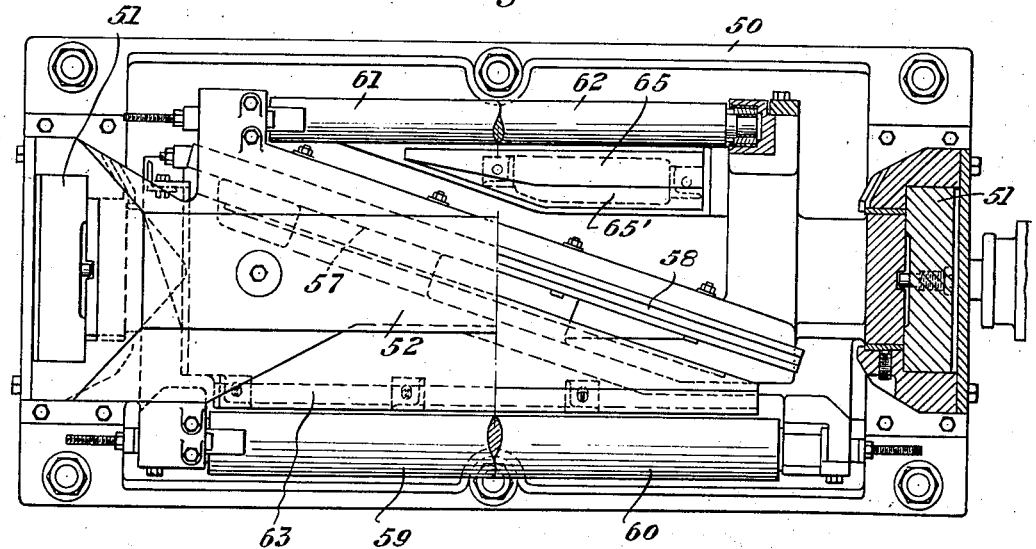
Figure 8 is a top plan of the apparatus shown in Figure 7.
Figure 7:
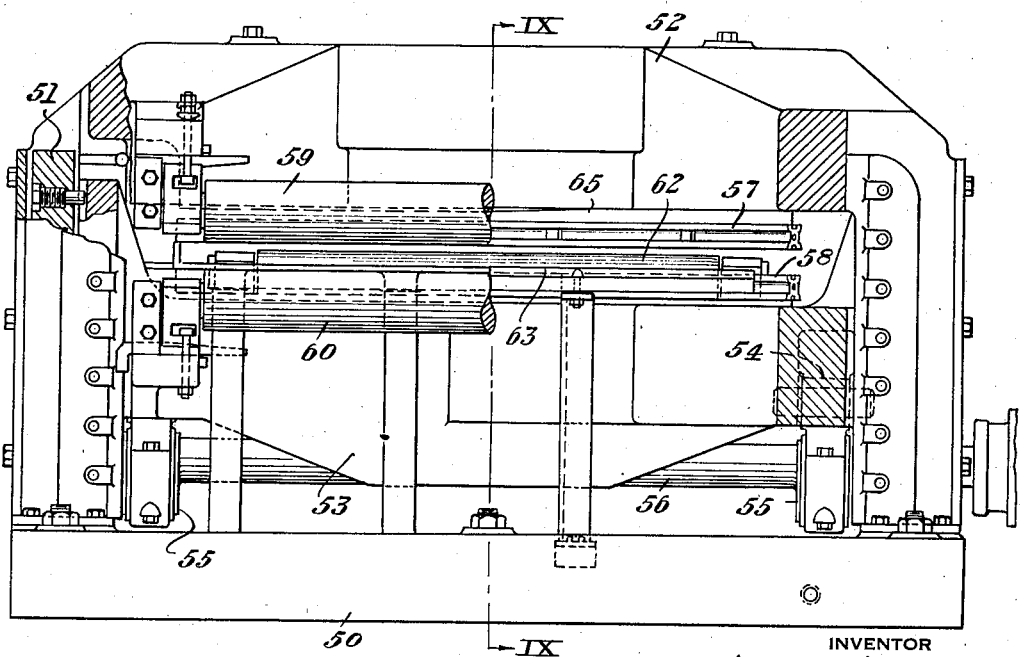
Figure 7 is a front elevation of a slightly modified form of machine employing diagonally extending knives in place of knives arranged in V form.

The trimmer shown in Figs. 7 to 9 inclusive is in most instances similar to that shown in Figs. 1 to 6, the principal differences being that the knives, instead of being convergent, extend in a diagonal direction across the full width of the members on which they are carried so that the trimming operation starts at one end of the weld and travels across the width of the strip instead of starting at the middle as it does where the knives are arranged in V form. Since the general construction of the machine is the same as that previously described, only brief reference is made to the general construction of the machine. It comprises a base member 50 with end posts 51. The top knife carrier 52 is constructed as previously described. The lower knife carrier is designated 53 and it is operated through pitmans 54 and eccentrics 55 from a shaft 56 driven from a motor as previously described in connection with Figs. 1 to 6. The knives, designated 57 and 58 have a cross sectional shape similar to that shown in Fig. 6 and they are retained in place by means of bolts as shown in Fig. 6. The knives, instead of being arranged in V form, extend continuously from one side of the carrier on which they are mounted to the other in a generally diagonal direction. This eliminates any necessity for a pointed insert. The machine is provided with an upper front roller 59 and a lower front roller 60 corresponding to the rollers 27 and 30 respectively and adjustable in the same way. There is also an upper rear roller 61, and a lower rear roller 62 resiliently supported, these rollers corresponding to the rollers 37 and 40 respectively of Fig. 1.

In addition to the change in the arrangement of the knives, I have shown in this modification of the machine, a stationary table member 63 supported by fixed standards 64 on the base, the top of the table 63 being above the plane of the lower knife 58 when the lower knife carrying ram is in its lowermost position. When the lower knife carrying ram is elevated to the trimming position, it is raised above the level top of the table 63. This table 63 holds the strip material from scraping against the lower knife when the strip material is drawn through the trimmer after the weld has been trimmed and when the machine is opened up. Likewise, there may be a fixed member 65 on a fixed support 66 in advance of the lower roll 62. This supporting member 65 has a forwardly beveled edge 65' to facilitate the threading of the strip material through the trimmer. The member 65, being back of the diagonal knife 58, fits into a stationary triangular space and is therefore of less width than the full width of the machine. By using a single diagonal upper and lower knife, the construction of the machine is simplified and the knives can be more quickly changed and turned over for dressing and a continuous cutting edge is presented to the weld.

Through the provision of two movable knife carriers, one of which imparts motion to the other through the intervening strip material, the proper relation of the knives to the surface of the strip is secured and the machine automatically adjusts itself to different thicknesses of strip. I have, for convenience, designated the knife carriers as "upper" and "lower" carriers, but this is primarily for convenience of description, as any opposed disposition of the knife carriers with power means for moving one toward the other, the other being biased to "float" or ride against the strip with sufficient pressure to resist the thrust of the knives when cutting may be satisfactorily employed without respect to which is uppermost.

While I have illustrated and described in detail certain preferred embodiments of my invention, it will be understood that this is by way of illustration and the various changes and modifications may be made in the construction shown within the scope of my invention.

I claim:

1. A trimming machine of the class described comprising a vertically movable upper knife carrier and a vertically movable lower knife carrier movable into and out of position for raising and lowering the upper knife carrier, means for operating the lower knife carrier, a trimming knife on each of said carriers, and work-engaging means on both carriers for maintaining a minimum spacing between the knives thereof at least as great as the thickness of the material to be acted upon by the knives.

2. A trimming machine of the class described comprising a supporting member, an upper knife carrier slidably mounted for vertical movement on the supporting member, the upper knife carrier and the supporting member having cooperating means for limiting the downward movement of the upper knife carrier, a lower knife carrier under the upper knife carrier and movable from a lowermost position where it is clear of the upper knife carrier to a raised position where it will lift the upper knife carrier, both of said carriers having trimming knives thereon, and work-engaging means on both carriers maintaining a minimum spacing between the knives thereof at least as great as the thickness of the material separating the work-engaging means.

3. A trimming machine of the class described, comprising a supporting structure, an upper knife carrier mounted in the supporting structure for vertical movement, the upper knife carrier and the supporting structure having cooperating means for limiting the downward movement of the upper knife carrier to a predetermined position, a lower knife carrier under the upper knife carrier and normally spaced therefrom to provide an opening between the two knife carriers through which strip material may be pulled, strip engaging means on the upper knife carrier adapted to ride on strip material passing through the trimmer, correspondingly positioned strip engaging means on the lower knife carrier for engaging the strip material, and means for raising the lower knife carrier from its lower position to an elevated position, the strip engaging means on the lower knife carrier serving to transmit vertical movement through a portion of the travel of the lower knife carrier to the upper knife carrier, and trimming knives on the two knife carriers separated from each other a distance slightly greater than the separation of the strip-engaging means of the two carriers.

4. A trimming machine of the class described comprising two movable knife carriers, one of which moves relatively to the other during a portion of its travel and which transmits movement to the other during the remainder of its travel, means for operating said carrier through the range of its movement, knives on the opposed faces of the two carriers, and strip-engaging means on the two carriers separated from each other by a vertical distance slightly less than the vertical distance between the carriers of the two knives for keeping the knives separated a distance greater than the normal thickness of the strip material to be operated upon.

5. A trimming machine of the class described with knives on the opposed faces thereof, said carriers also having opposed strip engaging means for bearing against the surface of strip material passing between the knives, means for moving one of said carriers toward and away from the other, the other being normally positioned in the path of travel of the first whereby during a portion of the movement of the first carrier motion may be transmitted from the first to the second carrier through the strip material which is engaged between the strip engaging means on the two carriers, the said opposed strip-engaging means of the two carriers being separated from each other at all times a vertical distance slightly less than the distance which separates the knives of the two carriers for maintaining the knives separated a distance slightly greater than the material passing between the opposed strip-engaging means of the two carriers.

6. A trimming machine comprising opposed knife carriers with knives on the opposed faces thereof, said carriers also having opposed strip engaging rollers mounted on the opposed faces thereof, the rollers being positioned to bear against any strip material passing between the knives of the two carriers when the two carriers are in strip engaging position, one of said carriers being movable toward and away from the other, the other being normally positioned in the path of travel of the first whereby during a portion of the movement of the first carrier motion may be transmitted from the first to the second carrier, such motion being transmitted from the roller on the first carrier through the strip material to the roller on the second carrier whereby the trimming machine automatically adapts itself to operation on sheets of different gauges.

7. A trimming machine of the class described comprising a vertically movable lower knife carrier having a knife thereon and having a strip engaging element thereon adjustable up and down with respect to the knife, a supporting structure on which the lower knife carrier is mounted, an upper knife carrier mounted on the supporting structure and movable up and down with respect thereto, the upper knife carrier and the supporting structure having means for limiting the downward movement to a level above the lowermost limit of travel of the lower knife carrier whereby an open space is normally provided between the two carriers through which strip material may pass, a knife on the upper knife carrier, a strip engaging element on the upper knife carrier spaced above the corresponding element of the lower knife carrier and adjustable up and down with respect to the knife on the upper knife carrier, and means for raising the lower knife carrier from a normal position to a position above the lowermost position of the upper knife carrier whereby the upper knife carrier is lifted a limited distance when the lower knife carrier is raised to its uppermost position, motion being transmitted from the lower carrier to the upper carrier through strip material passing through the strip engaging elements of the two carriers whereby the spacing of the knives for trimming is determined by the thickness of the strip material passing between the strip engaging elements.

8. A trimming machine for trimming welds which unite lengths of strip metal comprising an upper knife carrying member and a lower knife carrying member, both of which are vertically movable, the lower one having a range of movement greater than the upper one and greater than the maximum separation between the two, means for raising and lowering the lower knife carrier member between its lowermost position and its uppermost position, and opposed work-engaging means on each of the two knife-carrying members for engaging strip material passing between the two knives for maintaining a minimum separation of the knives on the two carriers, said work-engaging means being so positioned that the knives are always separated a distance at least as great as the normal thickness of the strip material to be operated upon.

9. A trimming machine for trimming welds which unite lengths of strip metal comprising an upper knife carrying member and a lower knife carrying member, both of which are vertically movable, the lower one having a range of movement greater than the upper one and greater than the maximum separation between the two, and means for raising and lowering the lower knife carrier member from its lowermost position to its uppermost position, both of said knife carrying members having vertically adjustable sheet engaging elements thereon for riding against the strip material passing between the two members and determining the minimum separation thereof.

10. A trimming machine of the class described comprising a supporting structure, a lower knife carrying member movable up and down in the supporting structure from a lower position to an upper position, means for raising and lowering said lower knife carrying member, an upper knife carrying member slidable vertically on the supporting structure and having a lowermost limit of movement below the uppermost limit of movement of the lower knife carrier, a knife in each of said knife carrying members, and a vertically adjustable roller member on each of said knife carrying members for determining the clearance between the knives and the surface of strip material passing through the trimming machine when the lower knife carrier is in its uppermost position.

11. A trimming machine of the class described comprising an upper knife carrier, a knife on said upper knife carrier, a forward strip engaging roll on the upper knife carrier, a rear strip engaging roll on the upper knife carrier, said rolls being vertically adjustable with respect to the cutting edge of the knife, a supporting structure in which the upper knife carrier is mounted for sliding movement, a lower knife carrier, a trimming knife on the lower knife carrier, a forward and rear strip engaging roll on the lower knife carrier positioned under the corresponding rolls of the upper knife carrier, the forward strip engaging roll on the lower knife carrier being adjustable vertically with respect to the cutting edge of the knife on said carrier, the rear strip engaging roll on the lower knife carrier being resiliently supported, said lower knife carrier being movable from a position below the lowermost limit of movement of the upper knife carrier to a position above said lowermost limit of movement of the upper knife carrier, and means for raising and lowering the lower knife carrier.

12. A trimming machine of the class described comprising an upper knife carrier, a knife on said upper knife carrier, a forward strip engaging roll on the upper knife carrier, a rear strip engaging roll on the upper knife carrier, said rolls being vertically adjustable with respect to the cutting edge of the knife, a supporting structure in which the upper knife carrier is mounted for sliding movement, a lower knife carrier, a trimming knife on the lower knife carrier, a forward and rear strip engaging roll on the lower knife carrier positioned under the corresponding rolls of the upper knife carrier, the forward strip engaging roll on the lower knife carrier being adjustable vertically with respect to the cutting edge of the knife on said carrier, the rear strip engaging roll on the lower knife carrier being resiliently supported, said lower knife carrier being movable from a position below the lowermost limit of movement of the upper knife carrier to a position above said lowermost limit of movement of the upper knife carrier, and means for raising and lowering the lower knife carrier, the forward strip engaging rolls of both knife carriers being spaced forwardly of the knives, the rear strip engaging rollers being located rearwardly of the knives.

13. A trimming machine of the class described comprising an upper knife carrier, a knife on said upper knife carrier, a forward strip engaging roll on the upper knife carrier, a rear strip engaging roll on the upper knife carrier, said rolls being vertically adjustable with respect to the cutting edge of the knife, a supporting structure in which the upper knife carrier is mounted for sliding movement, a lower knife carrier, a trimming knife on the lower knife carrier, a forward and rear strip engaging roll on the lower knife carrier positioned under the corresponding rolls of the upper knife carrier, the forward strip engaging roll on the lower knife carrier being adjustable vertically with respect to the cutting edge of the knife on said carrier, the rear strip engaging roll on the lower knife carrier being resiliently supported, said lower knife carrier being movable from a position below the lowermost limit of movement of the upper knife carrier to a position above said lowermost limit of movement of the upper knife carrier, means for raising and lowering the knife carrier, the forward strip engaging rolls of both knife carriers being spaced forwardly of the knives, the rear strip engaging rollers being located rearwardly of the knives, and a stationary table member in the supporting structure, the top plane of which is above the level of the knife of the lower knife carrier when said lower knife carrier is in its lowermost position.

14. A strip trimming machine of the class described comprising an upper and lower knife carrier, each of which has a knife receiving offset thereon, each offset having a vertically projecting tongue and horizontally projecting tongue, and knife members received in each offset, the knife members being of a generally square cross section, whereby four cutting edges are provided, the knife members having longitudinal grooves on each face thereof for cooperation with the tongues on said offsets, and means for removably holding the knives in position in the offset.

LORENZ IVERSEN.